United States Patent
Brennan

(10) Patent No.: US 7,772,480 B2
(45) Date of Patent: Aug. 10, 2010

(54) INTERACTIVE MUSIC TRAINING AND ENTERTAINMENT SYSTEM AND MULTIMEDIA ROLE PLAYING GAME PLATFORM

(75) Inventor: Edward W. Brennan, Cupertino, CA (US)

(73) Assignee: SonicJam, Inc., Cupertino, CA (US)

( * ) Notice: Subject to any disclaimer, the term of this patent is extended or adjusted under 35 U.S.C. 154(b) by 0 days.

(21) Appl. No.: 12/146,378

(22) Filed: Jun. 25, 2008

(65) Prior Publication Data

US 2009/0038468 A1 Feb. 12, 2009

Related U.S. Application Data

(63) Continuation-in-part of application No. 11/891,369, filed on Aug. 10, 2007.

(51) Int. Cl.
G09B 5/00 (2006.01)
G10H 1/18 (2006.01)
A63F 13/00 (2006.01)
G06F 19/00 (2006.01)

(52) U.S. Cl. .................. 84/615; 434/307 A; 463/7; 463/35; 463/43; 700/94

(58) Field of Classification Search ............. 434/307 R, 434/307 A; 84/470 R, 609, 610, 615, 616, 84/618, 625, 626, 634; 463/7, 23, 35–38, 463/43; 700/94
See application file for complete search history.

(56) References Cited

U.S. PATENT DOCUMENTS 5,565,639 A * 10/1996 Bae .......................... 84/477 R
5,889,223 A    3/1999 Matsumoto
6,117,014 A *  9/2000 Aoyama et al. ............... 463/43
6,402,619 B1 * 6/2002 Sato ............................ 463/43
6,482,087 B1 * 11/2002 Egozy et al. ................... 463/7
6,561,907 B2 * 5/2003 Shimizu et al. ............... 463/31
7,164,076 B2 * 1/2007 McHale et al. ................ 84/616
7,275,986 B2 * 10/2007 Mori et al. ..................... 463/8

(Continued)

OTHER PUBLICATIONS

Form PCT/ISA/220, "PCT Notification of Transmittal of the International Search Report and the Written Opinion of the International Searching Authority, or the Declaration," 1 pg.
Form PCT/ISA/210, "PCT International Search Report," 4 pgs.
Form PCT/ISA/237, "PCT Written Opinion of the International Searching Authority," 5 pgs.

*Primary Examiner*—Jeffrey Donels
*Assistant Examiner*—Andrew R Millikin
(74) *Attorney, Agent, or Firm*—Courtney Staniford & Gregory LLP

(57) ABSTRACT

A music training and entertainment system allows a user to input a selection of source music in a native format, and isolates a desired vocal or instrument component within the source music. The user selects the component of the source music against which to be compared. The system suppresses the non-selected components of the source content to isolate the user-selected component. The system receives user input corresponding to the isolated component, and matches the user's performance to the original performance on the basis of pitch, rhythm, and quality comparisons. In a graphical user interface, avatars representing the user and judges are displayed in relation to an audience. Audience reaction is configured to reflect a score obtained by the user. A lyric extraction and generation process displays lyrics to a song in real time to the user as the music track is played.

9 Claims, 15 Drawing Sheets

U.S. PATENT DOCUMENTS

2005/0182504 A1 8/2005 Bailey
2006/0212148 A1* 9/2006 Fitzgerald et al. ............. 700/94
2007/0167204 A1* 7/2007 Lyle et al. ..................... 463/9
2008/0000970 A1 1/2008 Savage et al.

* cited by examiner

Source

User

| QUALITY SCORE | CONVERTED SCORE | SUBJECTIVE SCORE |
| --- | --- | --- |
| 0-10 | 1 | Terrible |
| 11-20 | 2 | Lousy |
| 21-30 | 3 | Bad |
| 31-40 | 4 | Crummy |
| 41-50 | 5 | Mediocre |
| 51-60 | 6 | Sub Par |
| 61-70 | 7 | OK |
| 71-80 | 8 | Good |
| 81-90 | 9 | Excellent |
| 91-100 | 10 | Terrific |

FIG. 11

INTERACTIVE MUSIC TRAINING AND ENTERTAINMENT SYSTEM AND MULTIMEDIA ROLE PLAYING GAME PLATFORM

CROSS-REFERENCE TO RELATED APPLICATIONS

The current application is a continuation-in-part application of U.S. patent application Ser. No. 11/891,369, entitled "Interactive Music Training and Entertainment System" and filed on Aug. 10, 2007.

FIELD

Embodiment of the present invention relates generally to interactive entertainment systems, and more specifically to an interactive vocal and instrument training system.

BACKGROUND

The advent of karaoke machines and video games that allow people to sing or play an instrument along with accompanying background track have ushered in a new form of entertainment, as people can interactively provide their contribution to a piece of music. While typical karaoke systems have evolved in a direction that facilitates singing over a piece of pre-recorded music by providing graphic and lyrical cues over a instrumental backing track, such systems provide a relatively narrow entertainment experience and do not perform any analysis or provide the necessary feedback that is necessary for allowing amateur singers or musicians to improve their vocal or instrumental skills. Likewise traditional music teaching methods, such as in-person or video-taped lessons generally lack an entertainment component that genuinely engages a student.

Many present music playback systems consist of a microphone, a source or input for recorded music, an amplifier, and speakers for audio output. These systems allow a user to sing or play over a piece of music and hear his or her performance played over the original music track. Such systems, however, include the all of the original vocal and instrument tracks and it is difficult, therefore to accurately hear or judge the accuracy of the superimposed portion over the original music. Basic karaoke machines provide source music in which the vocal component (or an instrument component) has been suppressed or reduced in volume so that a user's input can be more clearly heard over the source music. Such systems consist of an audio mixer with a microphone input built into a music playback system. These music playback systems can be tape machines, Compact Disc (CD) machines, Video CD, Laser Disc, DVD (Digital Versatile Disc) machines, streaming media players, or any similar playback machine. Most karaoke machines employ a specially formatted source track, such as CD+G that includes graphic data in addition to the audio data on the disk. These graphics can display lyrics, music notation, and any video or graphic image that is suitable for playback on the karaoke machine. Another audio standard that has been developed for karaoke is the .KAR format for MIDI (Musical Instrument Digital Interface) players. This format is used in conjunction with computer programs that use MIDI instrumentation to generate the accompaniment rather than a recorded track.

Basic karaoke systems rely on music sources in which the audio portion for such customized formats and media typically has the vocal (or other desired instrument) component entirely eliminated through deletion of such tracks from the source media (e.g., master tape or disc) or through replication on a different (e.g., purely instrumental version). Such systems thus require special instrument-only tracks to be provided or require the use of non-original source music. Such systems also require expensive and complicated playback systems. This prevents such systems to be used with any type of source music and in any format.

Many basic music playback entertainment systems may be set up to provide a "karaoke mode" that attempts to remove the vocal track from a regular audio CD. Such methods are typically based on a crude center removal technique that tries to take advantage of the fact that the vocals in most music are in the center in a stereo system, as opposed to either solely on the right channel or the left channel. The vocal track is thus of equal volume on both stereo channels with no phase difference, and the center removal technique subtracts the left channel from the right channel in an attempt to cancel out the common vocal signal. This approach however often results in poor performance due to the simple fact that many other instruments are mixed in the center and are consequently also removed.

While karaoke systems are fine as entertainment systems for interactive singing, they do not provide an adequate platform for music training, as they are typically expensive and rely on a proprietary music format and playback system, and require the user to pay for each instance of a playback session, thus forcing multiple payments for the same song. Traditional music training systems based on classes or video-based or online lessons are often limiting in that they can be expensive, stressful and/or uninteresting. The popularity of television shows, such as American Idol®, has spawned the release of video games that try to replicate the music audition environment in which users attempt to sing or play along with piece of music to compete and receive a score based on their performance. Such systems, however, provide only a limited number of source songs, and require music tracks that are tagged or formatted to special requirements. Such systems typically also provide very limited user input and system feedback information.

What is needed, therefore, is a music training and entertainment system that accepts user input of a selection of source music in a native format and that is available from various online sources, isolates a desired vocal or instrument component within the source music, compares the user's performance to the source performance, and then provides meaningful and entertaining feedback in a manner that encourages the user to practice and improve his or her performance.

What is needed, therefore, is a music training and entertainment system that extracts lyrics from a source recording and provides a lyric track to a user based on the actual performance that is being compared.

What is further needed is a music based entertainment system that provides different views of a performance with true interactive audience participation and feedback.

BRIEF DESCRIPTION OF THE DRAWINGS

Embodiments of the present invention are illustrated by way of example and not limitation in the figures of the accompanying drawings, in which like references indicate similar elements and in which:

FIG. 7 is an example screen display for a web-based music training and entertainment system, under an embodiment.

FIG. 11 is a table that illustrates a correlation of quality scores to converted scores and subjective feedback, under an embodiment.

DETAILED DESCRIPTION

Embodiments of a music training and entertainment system are described that allows a user to input a selection of source music in a native format, isolates a specified vocal or instrument component within the source music, compares a user input to the specified source component, and provides entertaining feedback to the user based on the comparison. The user selects the component of the source music which he or she will provide, such as a song's vocal track. The system suppresses the non-selected components of the source content to isolate the user-selected component. The system receives user input corresponding to the isolated component, and compares the user's performance to the original performance. The system then provides meaningful and entertaining feedback to allow the user to practice and improve his or her performance. In a multi-user configuration, a number of users, such as a band or ensemble can provide a performance, or individual users can compete against each other to see who can obtain the highest score.

In the following description, numerous specific details are introduced to provide a thorough understanding of, and enabling description for, embodiments of the music training and entertainment system. One skilled in the relevant art, however, will recognize that these embodiments can be practiced without one or more of the specific details, or with other components, systems, and so on. In other instances, well-known structures or operations are not shown, or are not described in detail, to avoid obscuring aspects of the disclosed embodiments.

Figure 1:
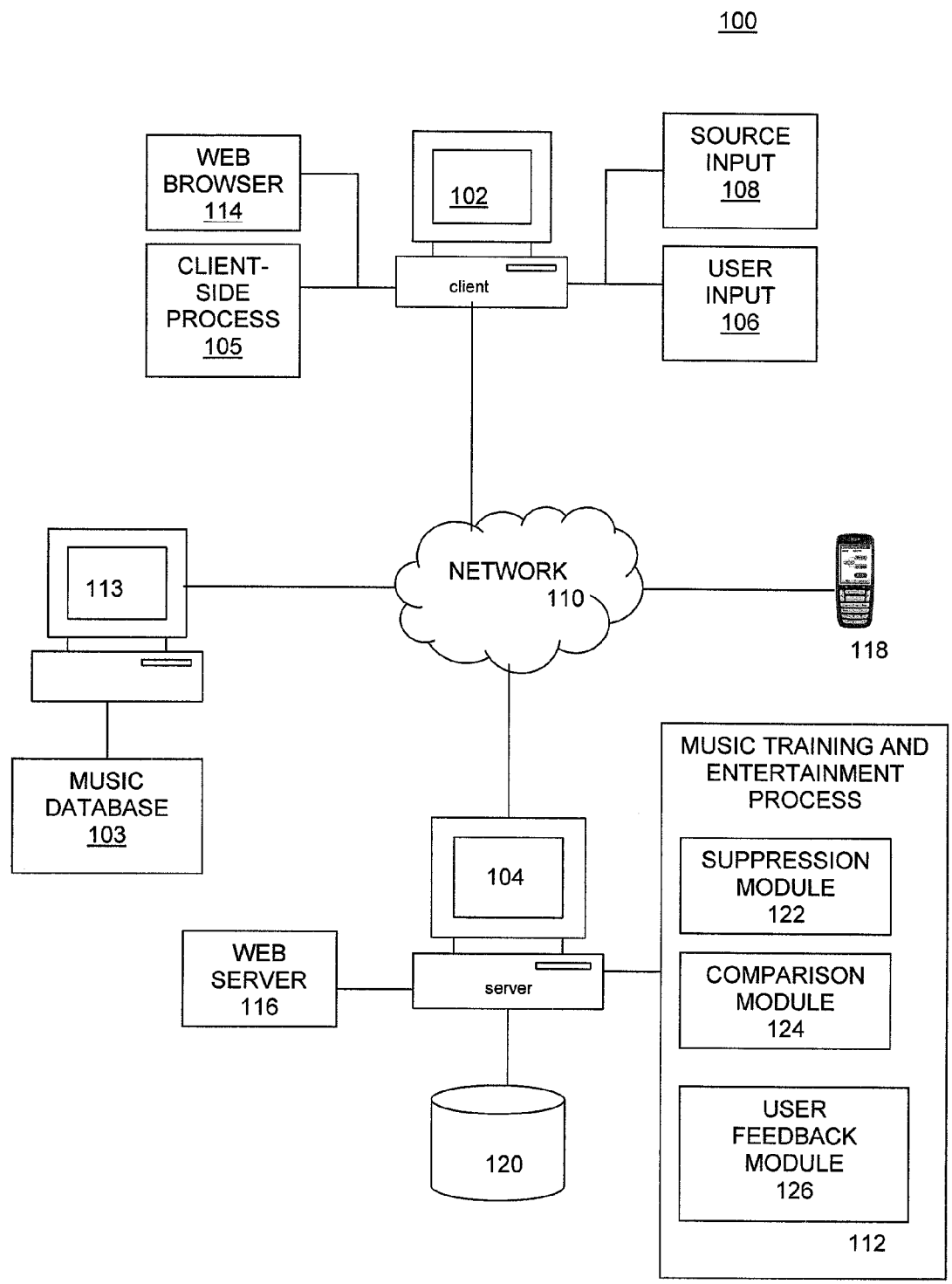
FIG. 1 is a block diagram of a computer network system that implements embodiments of a music training and entertainment system.

Aspects of the one or more embodiments described herein may be implemented on one or more computers executing software instructions. The computers may be networked in a client-server arrangement or similar distributed computer network. FIG. 1 illustrates a computer network system 100 that implements one or more embodiments. In system 100, a network server computer 104 is coupled, directly or indirectly, to one or more network client computers or computing devices 102 and 118 through a network 110. The network interface between server computer 104 and client computer 102 may include one or more routers that serve to buffer and route the data transmitted between the server and client computers, and network 110 may be the Internet, a Wide Area Network (WAN), a Local Area Network (LAN), or any combination thereof.

In one embodiment, the server computer 104 includes an optional World-Wide Web (WWW) server 116 or server clustering environment that stores data in the form of web pages and transmits these pages as Hypertext Markup Language (HTML) files over the Internet 110 to the client computers. For this embodiment, the client computers typically run a web browser program, such as 114 to access the web pages served by server computer 116 and any available content provider or supplemental server 113.

The network client computers are configured to run a client-side process that implements embodiments of a music training and entertainment process that allows a user to input source music and user provided vocal and/or instrument input for comparison and interactive judging on server computer 104. Another class of client computers is represented by mobile client 118. Mobile client 118 can be a mobile computing or communication device, such as a notebook computer, personal digital assistant (PDA), mobile phone, game console, or any similar class of mobile computing device with sufficient processing, communication, and audio/video playback capability.

As shown in FIG. 1, any of the processes executed on any of the client and/or server computers may also be referred to as modules or components, and may be standalone programs executed locally on the respective client computer, or they can be portions of a distributed client application run on the client or a network of client computers.

In one embodiment, server 104 in network system 100 is a server computer that executes a server side music training and entertainment system 112. The music training and entertainment system includes functional components that perform the tasks of receiving source and user input music content, separating one or more components from the source music, comparing the user input content with suppressed and counterpart components of the source music, and providing feedback regarding the user content. In general, the music entertainment system comprises two main portions, a front-end component that processes the source and user-input music content, and a back-end component that provides an interactive and entertainment oriented judging and feedback environment.

For the embodiment illustrated in FIG. 1, the music training and entertainment system includes a suppression (or isolation) module 122 and a matching (or comparison) module 124 that constitute major blocks within the front-end component of process 112. These two modules manipulate the received source music content to provide a basis for comparison with the user input music component. The back-end component primarily consists of a user feedback module 126 which provides scoring and feedback through text or graphics objects in a graphical user interface that may be configured to replicate a panel of judges or similar environment.

The music training and entertainment system 112 may represent one or more executable programs modules that are stored within network server 104 and executed locally within the server. Alternatively, process 112 may be stored on a remote storage or processing device coupled to server 104 or network 110 and accessed by server 104 to be locally executed. In a further alternative embodiment, the music training and entertainment system 112 may be implemented in a plurality of different program modules, each of which may be executed by two or more distributed server computers coupled to each other, or to network 110 separately. Throughout the description, the terms, "module," "component," and "process" may be used interchangeably to mean an computer program, routine, or subroutine that is executed on any of the server and/or client computers of FIG. 1, and may be implemented as software, firmware, or programmed hardware.

For an embodiment in which network 110 is the Internet, network server 104 executes a web server process 116 to provide HTML objects, typically in the form of web pages, to client computers coupled to the network. To access the HTML files provided by server 104, client computer 102 executes a web browser process 114 that accesses web pages available on server 104 and resources, such as supplemental server 113. The client computers may access the Internet 110 through an Internet Service Provider (ISP). Content for any of the programs or data associated with the music source and input used by the client computer 102 may be provided by a data store 120 closely or loosely coupled to any of the server 104 and/or each client computer. A separate content provider 113 may provide some of the data, such as source music from music database 103 that is provided to the music training process 112. Although data store 120 is shown coupled to the network server 104, it should be noted that content data may be stored in one or more data stores coupled to any of the computers of the network, such as network client 102 or to devices within the network 110 itself.

The functions of the music training and entertainment process 112 may be separated among client-side and server-side modules, as required or allowed by the system constraints and resources. In one embodiment, the process is distributed among client-side processes using a cloaking mechanism to reduce the number of servers that may be required to host the process. An encryption technique allows client-side processes to perform the necessary tasks using temporary code that is loaded onto the client computers.

The general purpose of the music training and entertainment process is to provide an entertaining way to provide constructive feedback to aspiring singers and musicians. It can also be used to gain insight into the vocal or instrument quality of a given user or musical performance. In a network environment, an interactive judging interface provided by user feedback module 126 provides a platform for competition among users.

In one embodiment, the music training and entertainment process 112 comprises an online system that separates a vocal or instrument component of any type of source music content, and compares a corresponding user input component to the original component to provide a comparison score. The original music without the separated component serves as a background track against which the user can provide his or her own performance. The system can be configured to output the combined background track and user performance, the user performance only, or the user performance with the full original source music.

Figure 2:
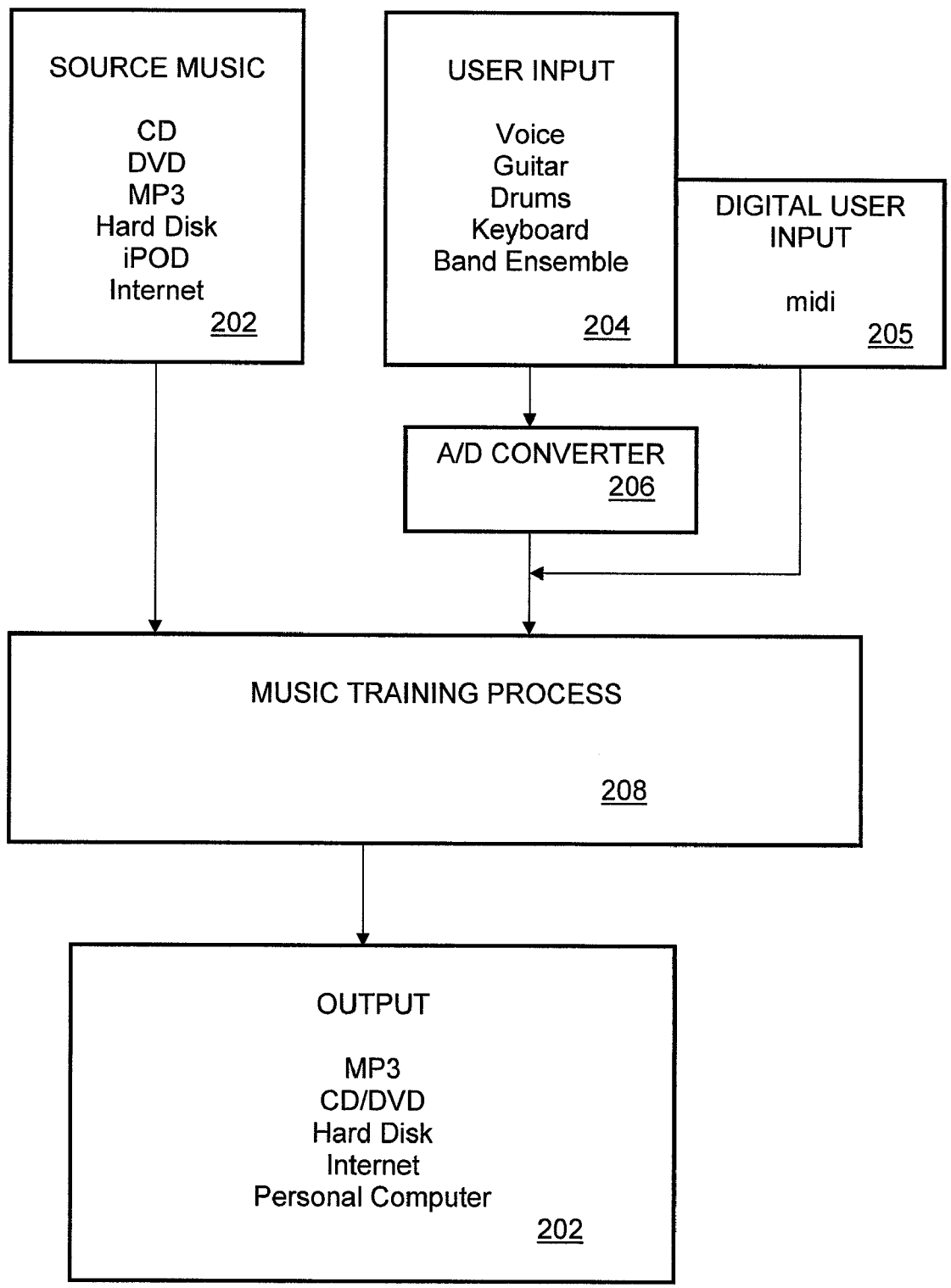
FIG. 2 is a flow diagram illustrating the input and output content of a music and entertainment system, under an embodiment.

FIG. 2 is a flow diagram illustrating the input and output content of a music and entertainment system, under an embodiment. The source music 202 can be any type of audio content such as music, spoken word, sounds, and so on. It is provided to the music training process 208 as digital data that is contained on any type of media, such as CD, DVD, or computer disk. It can also be provided in the form of streaming data such as from a music player an Apple® iPod™ or equivalent MP3 player, or from the Internet, or any similar source. The source can also be a video with audio content. In one embodiment, the source music may be provided in analog format, such as from a cassette tape or vinyl LP. In this case, it is first converted to digital format through a D/A (digital to analog) conversion process (not shown). The source music input can also be a live performance of a person or object that is making sounds against which the user wants to compare their performance. In one embodiment, the source music is converted to a standardized digital audio format, such as a WAV (waveform audio format) or AIFF (audio interchange file format) file, or any other compressed or uncompressed digital format suitable for audio content.

The user input that is compared to the source music component can be any type of input that corresponds to the component against which the user seeks comparison. Thus, the user can provide a vocal track, or any type of instrument track, such as guitar, drums or percussion, keyboard, horn, string, or any other type of instrument. In a typical implementation, the user input is provided by means of a microphone or other sensor that is either amplified or provided directly as a line input to a circuit of the music training process 208. Such vocal or instrument input constitutes an analog signal, which is converted to digital format through A/D converter 206. The user input could also comprise a number of users constituting a band or ensemble with each user providing an instrument and/or vocal track. In this case, the user input consists of multiple components that are compared against respective counterparts of the source music. If the user is inputting their component through a digital source 205, such as a MIDI interface or MIDI-enabled instrument, the A/D conversion stage 206 is not required, and this digital input is provided directly to the music training process 208.

The user input can also be provided in the form of video content, in which the user's performance is filmed or videotaped using a camcorder or similar video capture device. In this case, the audio portion of the video content is processed as if it were available as standalone audio content. The entire video of the user's performance can then be uploaded to an online site (e.g., youtube.com). Various different video formats can be used, such as Quicktime, MPEG, and the like.

The music training process 208 includes a suppression component that isolates a selected component from the source by suppressing the non-selected components. Thus, if the user wants to sing over a track, the vocal component of the source music would be isolated by suppression of the non-vocal tracks. Likewise, if the user wants to play the lead guitar portion of a song, this component of the source music would be isolated within the song, and so on. If a band or portion of a band is playing into the system, the components corresponding to their contributions would be isolated from the remaining background music.

In one embodiment, suppression of the non-selected components is performed as a background task, and the entire source music is played back to the user. Alternatively, the isolated component can be removed from the source music and the resulting background track can then be played back to the user so that the user can play or sing-along to add their performance to the music without simultaneously hearing the original component.

A comparison process within the music training process compares the user input component with the original source music component. Process 208 then provides an output, which could consist of the combined user and source performance or just the user performance. This is provided as digital data for storage onto any suitable media, such as CD, DVD, hard disk, and so on. Alternatively, it can be output as streaming data or as a digital file that can be uploaded to other computers or websites over the Internet, or other network.

In one embodiment, a front-end input circuit or box is coupled to or integrated in client computer 102 to receive both the source music content 202 and the user input 204. This system provides a distinct advantage over present game, video-based music training systems, or karaoke players in that the user can provide a song from any source and train against the actual song. The user is not limited to only the selection of songs provided by the system, nor is the user limited to using a manipulated or non-original version of a song.

Figure 3:
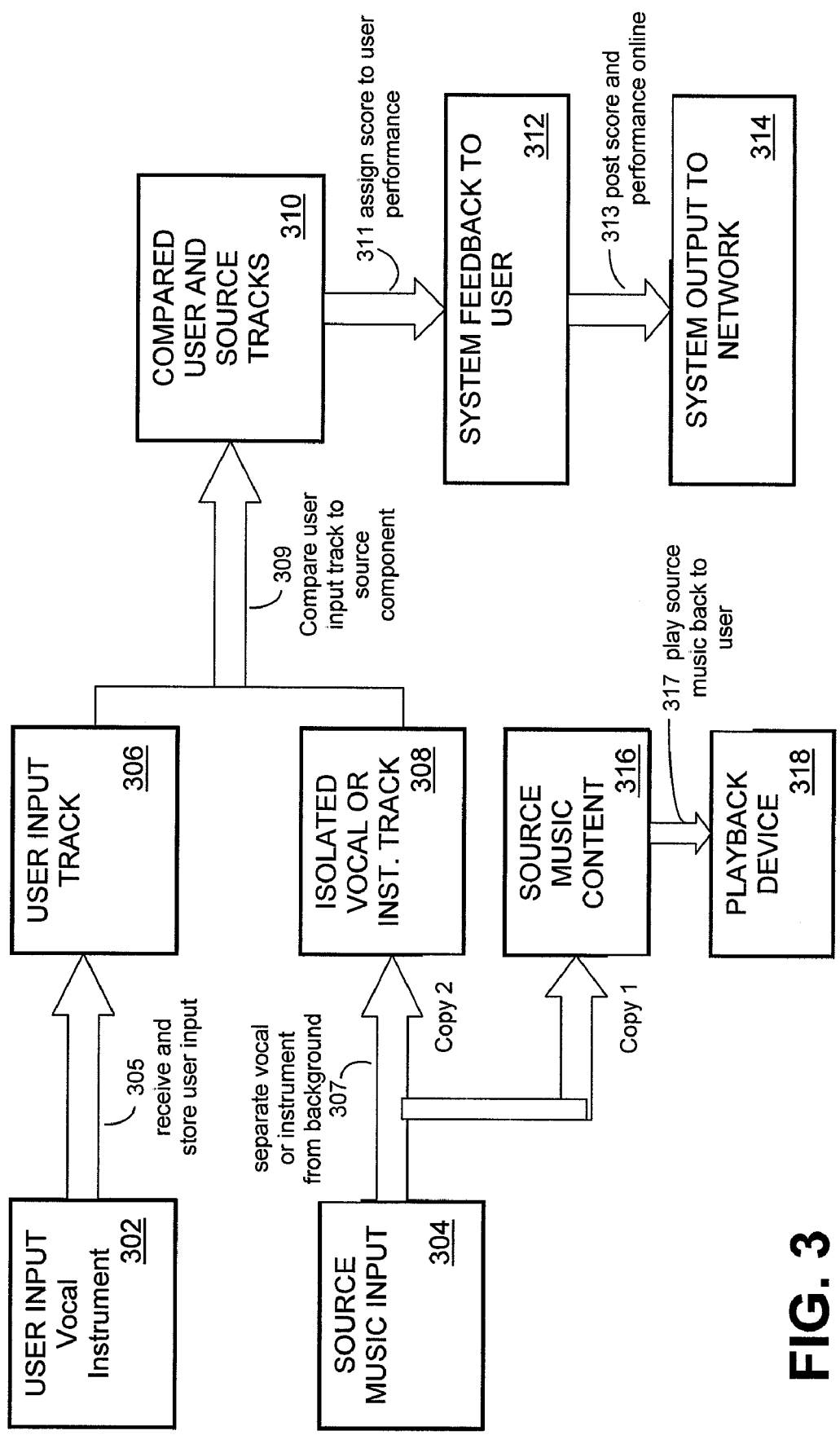
FIG. 3 is a flow diagram that illustrates an overall music training and entertainment process, according to an embodiment.

FIG. 3 is a flow diagram that illustrates an overall music training and entertainment process, according to an embodiment. For the process illustrated in FIG. 3, a user simultaneously inputs source music and his or her own performance into the system. This can be accomplished through playing both the song and simultaneously singing or playing over the song, or inputting the song and their vocal or instrument performance separately. The user input 302 consisting of a vocal or instrument component is received and stored by the system in step 305 to produce a user input track 306. The source music input 304 is provided to the system. The source music may be provided as a digital file or stream, or an analog signal. It is converted to a defined digital format (e.g., WAV or AIFF). The system then stores the source music content 316 as a first copy (copy 1). The user specifies which component or components of the music that he or she will provide. The suppression module 122 in process 112 eliminates or suppresses the non-selected components of the music in step 307 to produce a background track that consists of the original source music with the selected component isolated and separated out, block 308, and this is stored as a second copy (copy 2). The entire source music content, copy 1, is then played back to the user through a playback device 318, as shown in step 317. This provides a background reference against which the user can sing or play against. The user may adjust the volume of the playback device to aid the performance (e.g., raising the volume) or remove any assistance (e.g., lower the volume).

The system receives the user input through an input system (e.g., microphone or direct line in) as well as the playback of copy 1. The playback of copy 1 is typically picked up if a microphone is used by the user and the copy 1 playback volume is turned up high enough. If the user employs a direct instrument line input or turns the volume of copy 1 playback down, then the playback of copy 1 may not be picked up. The matching module 124 compares the user input track 306 to the copy 2 isolated source component 308, as shown in step 309. The compared user and isolated source components 310 are then used to generate a score for the user performance, step 311. In one embodiment, the system compares the two music streams through a matching algorithm that creates a score along a range, such as 0 to 100. The score is then displayed or provided back to the user through a system feedback component 312. In a networked implementation, the score and/or the performance can then be posted online, as shown in step 313 to provide system output to the network, 314.

Figure 4:
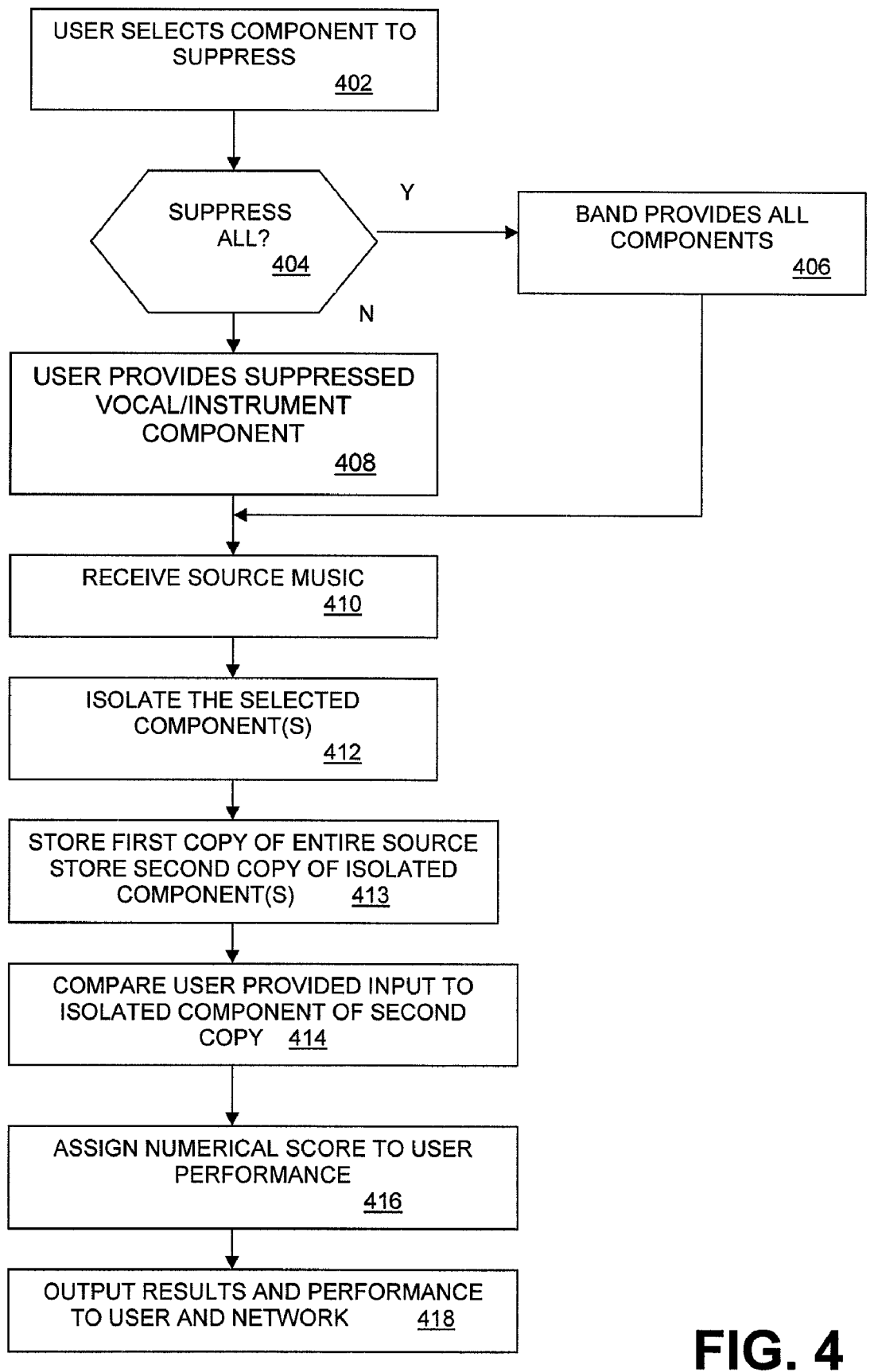
FIG. 4 is a flowchart that illustrates steps in process of processing source and user music content in a music training and entertainment system, under an embodiment.

FIG. 4 is a flowchart that illustrates steps in process of processing source and user music content in a music training and entertainment system, under an embodiment. In the process of FIG. 4, the user selects a pre-recorded piece of music from a source and selects it to be played by the system or other playback machine. In one embodiment, a user interface is provided that allows the user to select certain options with regard to the playback of the source content. These include volume, speed, duration, song selections, and other similar parameters. The user can also select which component should be compared to his or her performance, which dictates the component or components that are to be suppressed block 402. The system can be configured to accept user-provided input from a single user or from multiple users at once, such as a band or group. A single user can isolate a single component of a song for comparison, such as a vocal track, or even multiple tracks, such as voice and piano or guitar, and so on. If a full band is playing and wants to be compared with the original band performance, the user can choose to isolate and compare all components from the source content. If, in block 404, the user opts to compare all components, the band will provide all components, block 406, otherwise, the user provides the selected voice and/or instrument components, block 408. The user or band begins their vocal or instrument input in sync and tune with the source stream. The system then receives the source music, block 410 and suppresses the non-selected component or components, block 412. The vocal or instrument separation and suppression algorithm separates out the vocal or instrument content from the source stream for analysis in a comparison module. A copy of the entire source music is stored as a first copy, and the isolated component is stored as a second copy in the system, block 413. The system then performs a matching or comparison function on the isolated copy and the user input, block 414 and outputs a numeric score upon completion of the source feed, block 416. Results and output can be output to any appropriate medium or network, block 418.

Source-User Comparison Process

Although most implementations will comprise music as the source data, various types of audio data can be provided as the source data, including speech, natural sounds, sound effects, and so on. Regardless of the source content, audio data consists of sound and silence expressed through time. Several qualitative criteria are included in analysis algorithms employed by the comparison module of the system. The comparison module 124 is configured to compare certain pre-defined parameters associated with the source and user input content. In one embodiment, the elements of sound that are measured and compared are the pitch, rhythm, volume and sonic quality of the sound.

Each of these four major parameters themselves comprises a number of characteristics. For example, pitch comprises the perceived fundamental frequency of a sound and encompasses characteristics such as melody and harmony. The melody is series of linear events that vary over time, and harmony is the movement from one pitch simultaneity to another, and the structural principles that govern such progressions. Rhythm is the variation of the length and accentuation of a series of sounds and encompasses characteristics such as tempo and meter. Tempo is the speed or pace of a given piece of music, while meter describes the measurement of rhythmic units (e.g. "¾ time"). The quality of a sound refers primarily to the timbre, but also dynamics, articulation and texture. Timbre is the quality of a musical note or sound that distinguishes different types of sound production, such as voices or musical instruments. Articulation of sound is a direction or performance technique that indicates or affects the transition or continuity between notes or sounds, such as vocal slurs, or slides or bends on a guitar. Music dynamics refers to the softness or loudness of a sound or note, and equates generally to volume or amplitude of a signal. Finally, texture is a notion that describes the overall sound of a piece of music, such as dark, light, moody, and so on.

In one embodiment, the comparison module breaks each of the source component and user input component down into four main parameters of: pitch, rhythm, volume and quality. Each parameter of the user input component is compared with the corresponding parameter of the source component, and the resulting comparisons are each assigned a score along a pre-defined scale, such as 0 to 10 or 0 to 100, with 0 low. The scores for each parameter are then averaged to provide an overall score for the user performance.

In one embodiment, the music training and entertainment system includes one or more program modules that implement algorithms to suppress or isolate certain components of source music, and compare a user provided component to the corresponding source component. As shown in FIG. 2, a source piece of music is first uploaded into the system from virtually a source input (e.g., CD, DVD, MP3, etc.) as digital data. The uploaded music, regardless of source, is converted to a digital format file (e.g., WAV or AIFF). The original source content is duplicated for the comparison process.

A suppression process is applied to the uploaded digital file to separate out the user specified track or component portion of the music recording (e.g., vocals, guitar, drums, or other). A second function in the suppression process eliminates, purges or reduces the level of the components of the music recording that the user did not select. For example, if the user selected "vocals", the algorithm would purge all of the non-vocal portions of the music recording. This suppression and process occurs in the background, and during playback, the user hears the original source music in its entirety.

The user selected component of the music to be segregated from the remainder of the source is decomposed into digital units based on the parameters of pitch, rhythm, volume and quality. From these units, segments are formed based on temporal form and cross-channel continuity. Using an array of pre-selected pitch, rhythm and quality contours, the user selected music segment is isolated. A pre-determined array of values stored in a database of the system is utilized by the process. Spectral changes within each segment are analyzed, and a probability is assigned to each segment or unit using a Markov model, or similar process. If the probability exceeds a predefined threshold for match (e.g., 75%), that portion is segregated from the original recording. This segregated portion of the music will be used for the matching process that is executed by the comparison process.

Once the user selected portion of the music is isolated, the original recording is no longer needed to complete the sound comparison performed by the comparison process. Through the playback system, the user will continue to hear the original recording, however, the remaining music that did not pass the 75% threshold as part of the separation process is effectively removed by the process. In this case, the suppression process purges the remaining source music components from the system database and the resident memory on the host machine.

In one embodiment, the comparison process utilizes a matching algorithm that performs comparisons on the pitch, rhythm, volume and sonic quality parameters of the input music. Other parameters can be used, depending upon system constraints and requirements. Once the source digital file has been separated and suppressed based on the user selections, it is stored as a copy in the system, and this isolated source file is then compared to the user input stream. The user provides and records his or her own vocal, guitar, drum or other instrument component. In one embodiment, the system employs a DSP (digital signal processor) cross-correlation algorithm that matches the isolated source music file with the user input component. The system compares the user input and assigns a series of numeric values to each compared segment based on pitch, rhythm, and quality. These segment values are then aggregated and averaged over the length of the two compared files. An average score (e.g., 0-100) is assigned based on the individual scores of each compared segment. A separate score is assigned for each category of match for each parameter of pitch, rhythm, volume and quality. These three scores are then averaged to obtain a single score for the entire performance. In certain cases, the average may be a weighted average in which certain parameters or sub-parameter may be assigned a weight. In this manner, certain characteristics of a performance may be given greater emphasis than others. For example, if the user is drumming along with a song, the rhythm parameter may be given greater weight, while the pitch component may be given greater weight for a vocal comparison. The output of the comparison process generally comprises a single metric that represents the overall similarity of the user's performance with the source music content. This output value can be provided to the user and also used by the system in various other feedback contexts.

Figure 8A:
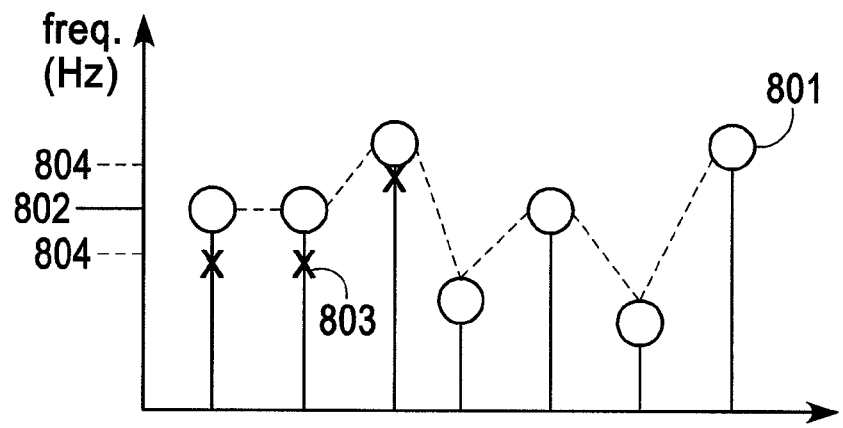
FIG. 8A illustrates the comparison of a source music component with a user provided component for the parameter of pitch, under an embodiment.

FIGS. 8A, 8B, 8C, and 8D illustrate the comparison of a source music component with a user provided component for each of the parameters of pitch, rhythm, volume, and quality under an embodiment. FIG. 8A illustrates the comparison of the pitch of the source music to the user performance, under an embodiment. The horizontal axis represents time in the appropriate unit of second, millisecond or microsecond, and the vertical axis represents the frequency of the notes as they are played in Hertz (Hz). The notes from the isolated component of the source music content (copy 2) are shown as circles 801 and the corresponding user input notes are shown as "X's" 803. Each note of the source component is mapped to a particular frequency 802, which is the reference frequency against which the corresponding user note is compared. Correlation of a source note with a corresponding user note is provided through an analysis of the rhythm parameter of the user component. The user note 803 is mapped to its actual frequency. The percentage deviation of the user note to the source note is then calculated and used to provide the percentage metric for that particular note. The percentage metrics for all of the notes for the song or music segment are then aggregated and averaged to provide an overall percentage metric for the rhythm component of the user performance. Thus, for example, if the source note was at 440 Hz, and the user sang the note a bit flat at 420 Hz, the system would register a certain percentage deviation in frequency for this note. A tolerance band demarcated by upper and lower bounds 804 is defined around the reference frequency. This represents the range in which the user note must fall in order to be recognized as a valid input for the system so that the user input note can be used for other parameter analysis. The tolerance band is pre-defined as a percentage, for example a user note must be within at least 70% in frequency along the Hz scale of the reference note in order to be a valid attempted note. Any unsung note or note that falls outside of the tolerance band would register a percent value of zero.

Figure 8B:
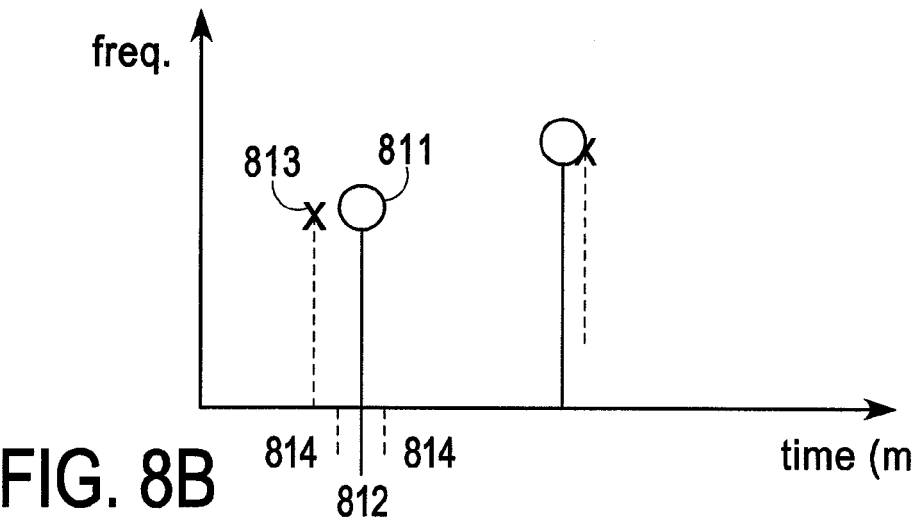
FIG. 8B illustrates the comparison of a source music component with a user provided component for the parameter of rhythm, under an embodiment.

FIG. 8B illustrates the comparison of the rhythm of the source music to the user performance, under an embodiment. As with FIG. 8A, the horizontal axis represents time in the appropriate unit of second, millisecond or microsecond, and the vertical axis represents the frequency of the played notes in Hertz (Hz). The notes from the isolated component of the source music content (copy 2) are shown as circles 811 and the corresponding user input notes are shown as "X's" 813. Each note of the source component is mapped to a particular time 812, which is the reference time against which the corresponding user note is compared. The user note 813 is mapped to its actual time. The percentage deviation of the user note to the corresponding source note is then calculated and used to provide the percentage metric for that particular note. The percentage metrics for all of the notes for the song or music segment are then aggregated and averaged to provide an overall percentage metric for the rhythm component of the user performance. Thus, for example, if the source note was at 10.21 seconds, and the user played the note a bit late at 10.35 seconds, the system would register a certain percentage deviation in time for this note. A tolerance band demarcated by upper and lower bounds 814 is defined around the reference frequency. This represents the range in which the user note must fall in order to be recognized as a valid input for the system so that the user input note can be used for other parameter analysis. The tolerance band is pre-defined as a percentage, for example a user note must be within at least 70% in time along the time scale of the reference note in order to be a valid attempted note. Any unsung note or note that falls outside of the tolerance band would register a percent value of zero.

A similar tolerance band can be defined for the volume of the performance relative to the source. FIG. 8D illustrates the comparison of the volume of the source music to the user performance, under an embodiment. The horizontal axis represents time in the appropriate unit of second, millisecond or microsecond, and the vertical axis represents the volume of the notes as they are sung or played in decibels. The notes from the isolated component of the source music content are shown as circles 821 and the corresponding user input notes are shown as "X's" 823. Each note of the source component is mapped to a particular volume 822, which is the reference volume against which the corresponding user note is compared. A tolerance band 824 with respect to the volume can be assigned so that if the volume of the sung note deviates from the source volume of that note by a certain amount, the overall score assigned to the user will be lowered by a defined amount. For example, a deviation of 10% may result in a reduction of 10 points, and so on. This tolerance band deviation scheme can also be used for the other parameters of pitch, rhythm, quality and so on.

Figure 8C:
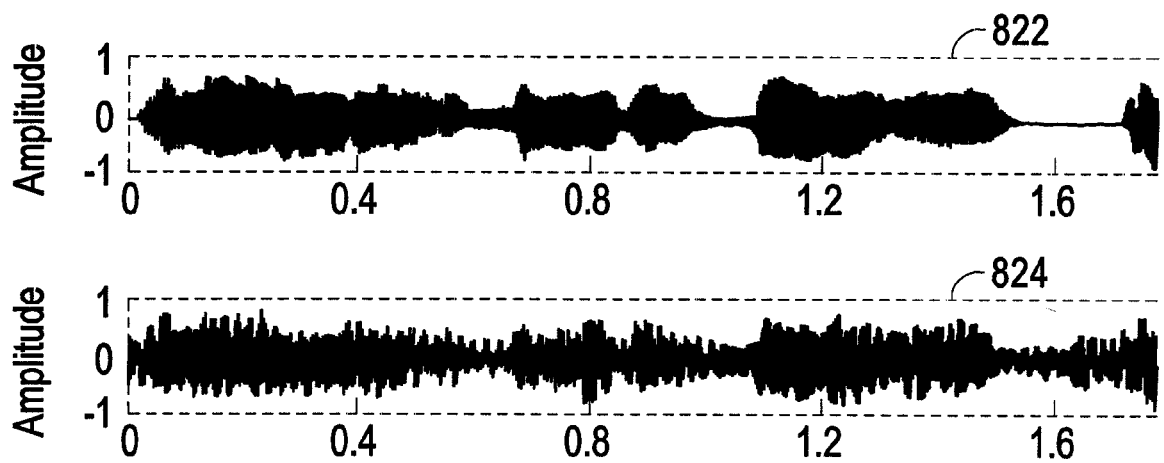
FIG. 8C illustrates the comparison of a source music component with a user provided component for the parameter of quality, under an embodiment.
Figure 8D:
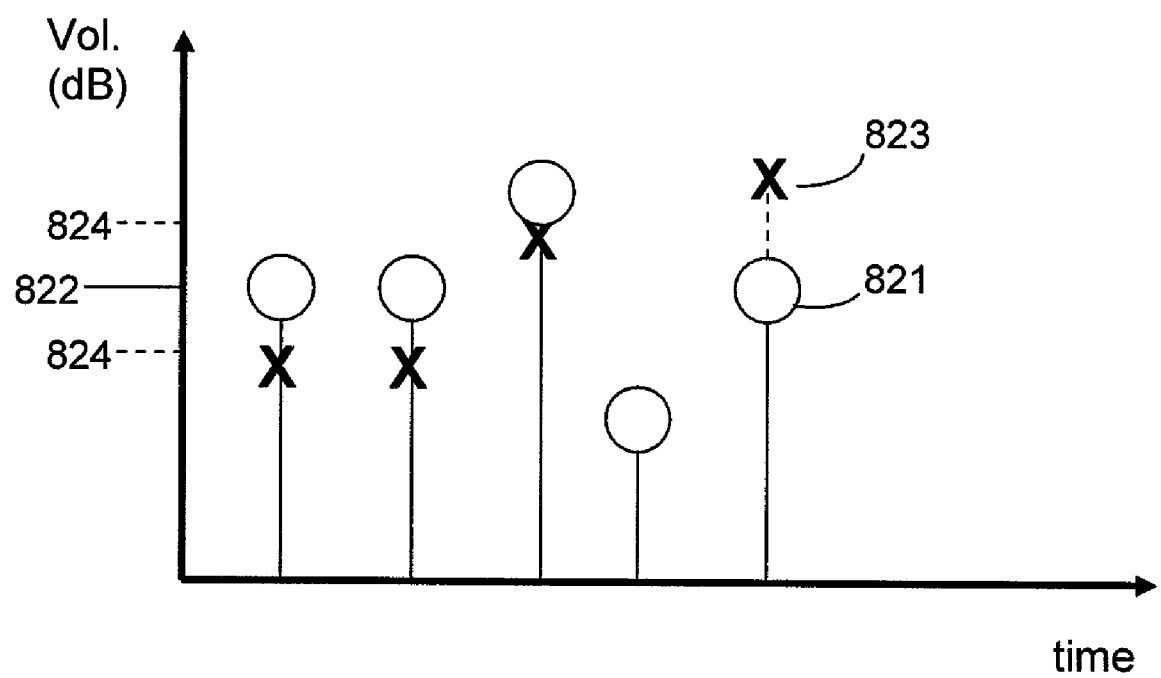
FIG. 8D illustrates the comparison of a source music component with a user provided component for the parameter of volume, under an embodiment.

FIG. 8C illustrates the comparison of the overall quality of the source music to the user performance, under an embodiment. The horizontal axis represents time in the appropriate unit of second, millisecond or microsecond, and the vertical axis represents the amplitude of the notes as they are played in decibels (dB) or other appropriate measurement unit. The stored isolated source component (copy 2) is represented as a waveform 822 that marks the amplitude of the notes against time. After the user performance is input and recorded, it to is captured and represented as a waveform 824 that marks the amplitude of the notes against time. Each waveform generates a measurable area. The area of the source component 822 is measured to provide a reference quality measurement. The area of the user performance 824 is then measured and compared to the reference a quality measurement. The percentage deviation of the user waveform area to the reference waveform area is then calculated and used to provide the percentage metric for the quality of the user metric. In an extreme case, two entirely different waveforms may give the same approximate area, but represent sounds that are of different quality. When coupled with the pre-defined tolerances of the pitch and rhythm analysis, however, the system forces a comparison of relatively similar waveforms. Moreover, even though the quality parameter might be close, in that the waveform areas are close, if either or both of the timing and pitch of the user performance against the source is not close, the overall score will be low.

In a further embodiment in which a video camera (e.g., a web cam) may be provided to take video of a performance, and in which the physical performance of a user is compared with the physical performance of a source performer, the movements of the user may be compared to the source performance. This is especially appropriate in applications, such as dance performances. In this embodiment, one or more motion detectors may be used conjunction with video cameras to track and store the user's movements. For this embodiment, the user's motion may not be compared to a source performance, but rather compared to what is expected of the genre. For example, if a poem is being read or a ballad is being sung, very little movement is expected. In this case, if the user moves erratically as sensed by the motion-detector/camera system than performance points may be deducted. Likewise, if a punk rock performance is being given, and the user stands still during the entire performance, this may be scored low.

As stated above, embodiments of the system use a cross-correlation DSP algorithm. In this case, the similarity of user notes to source (reference) notes for each of the parameters of pitch, rhythm and volume, as shown in FIGS. 8A, 8B, and 8D is performed using cross-correlation. In digital signal processing, the cross-correlation is a measure of similarity of two signals, commonly used to find features in an unknown signal by comparing it to a known signal. It is a function of the relative time between the signals, and is sometimes called the sliding dot product, and has applications in pattern recognition and crypto-analysis.

For continuous functions $f(x)$ and $g(x)$ the cross-correlation is defined as $$(f * g)(x) \stackrel{def}{=} \int f*(t)g(x+t)dt$$

where the integral is over the appropriate values of t.

Figure 5:
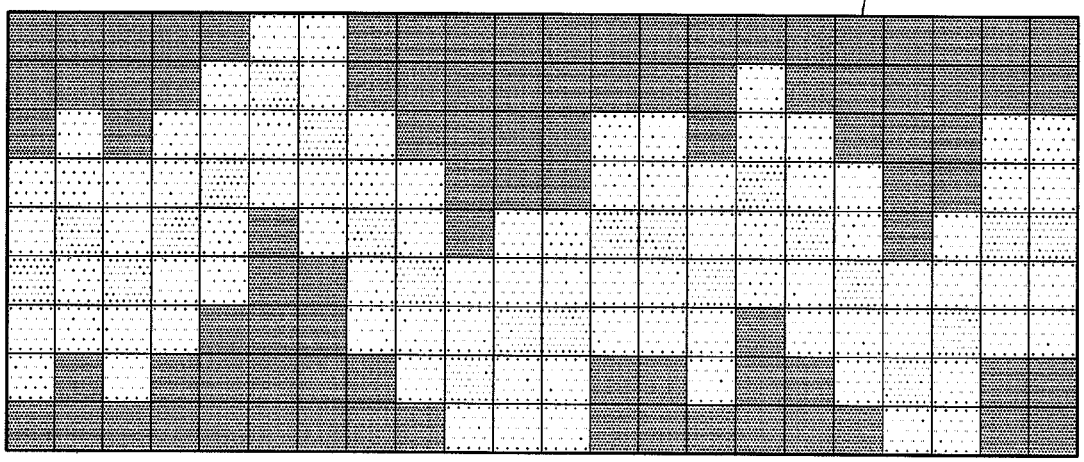
FIG. 5 illustrates the display of source dynamic range compared with user input, under an embodiment.
Figure 5:
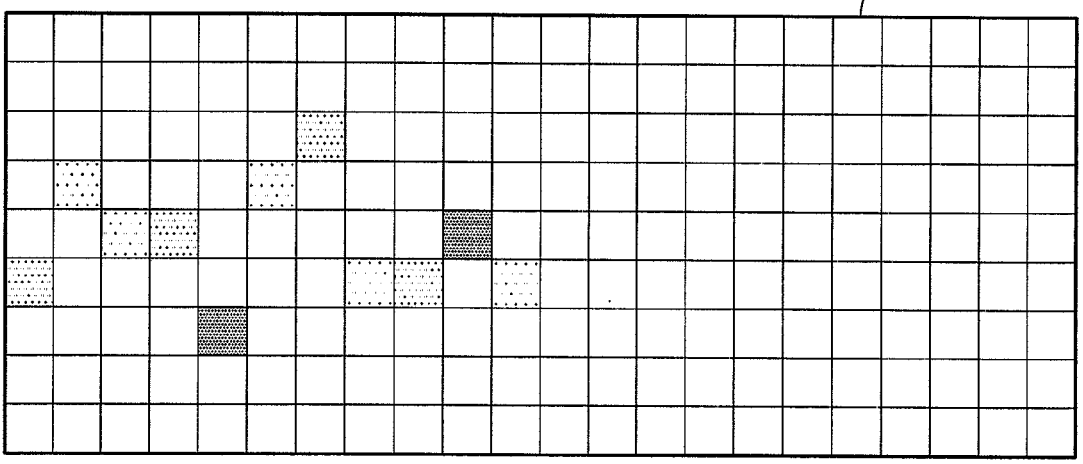

In one embodiment, the music training and entertainment system includes a number of different interactive teaching tools that help users improve their performance. In one embodiment, the system displays a graphical representation of the dynamic range of the source component prior to, or along with playback of the source music. This can help the user anticipate what is to be played. FIG. 5 illustrates the display of source dynamic range, under an embodiment. As shown in FIG. 5, a digitized waveform 502 represents a section of the source music with the selected component 503 displayed in isolation or contrast with the remaining background signal. This waveform is generated by scanning in the source music, isolating the user selected component by suppressing the non-selected components, and creating a visual map of the selected component 502. This visual map is then displayed to the user in advance of the user providing their own input as a visual queue of what to sing or play, or it can be streamed in conjunction with the playback of the source music to the user.

After the user input is received, the system similarly captures and stores the user provided stream and creates a visual map of the user input, 504. This user input visual map 504 can then be displayed in conjunction with the source waveform 502 too allow the user to view graphically how close he or she was to the source component. Various different shading or color schemes can be used to enhance the display of the source and user waveforms. The waveforms can be displayed as time versus pitch on the horizontal and vertical axis, respectively, as shown in FIG. 5. Rhythm or meter characteristics can also be displayed by altering the digitization of the time-base, and other sonic characteristics can also be accommodated through other visual cues.

Other training aids include an input component that allows the source music to be slowed down without a change in pitch or key. This aids a user in learning a particularly fast or complex portion of a song. An automatic transcribing component can also be included that displays the notes or chords to be played as the source music is input to the system.

Online Entertainment System

In one embodiment, the front-end portion of the music training system that consists of the suppression and matching processes is incorporated within an overall graphic-based entertainment system provides a platform for interaction among different users and even competition among these users. Such an environment may be web-based, such as illustrated in FIG. 1, or it may be embodied within a set-top box type of system, such as for use in game consoles, kiosks, and the like.

As stated above, the music training and entertainment system provides an overall score for the user's performance compared to the source music. In one embodiment, the quality score is converted to a scale that is represented by a subjective assessment of the user's performance. The quality score is generally assigned on a scale of 0-100, and thus the score number represents the percentage similarity of the user's performance to the source. Thus, a score of 50 would indicate that the user's performance was 50% of the source as averaged over the parameters of pitch, rhythm, volume, and quality. This percentage is then converted to a scaled score, such as between 0-10 or 0-5. The converted score is used to generate a subjective characterization assigned to each scaled score, such as "terrible" to "excellent." FIG. 11 is a table that illustrates a correlation of quality scores to converted scores and subjective feedback, under an embodiment. As shown in table 1100, the quality scores range from 0-100. These scores are converted to a 1-10 scale with each converted score representing a quality score within a certain quality score subrange. In an interactive feedback system, the converted score can be used correlate to a subjective score that is provided to the user. Ranging from 1 (low) to 10 (high), these subjective scores can be phrases that summarize the performance, such as terrible to terrific, as shown in table 800. The converted score could constitute any appropriate range, such as 1-2 (e.g., Acceptable, Unacceptable), 1-3 (e.g., Bad, Average, Good), 1-5 (e.g., Bad, Poor, Average, Fair, Good), or any other range.

Figure 6:
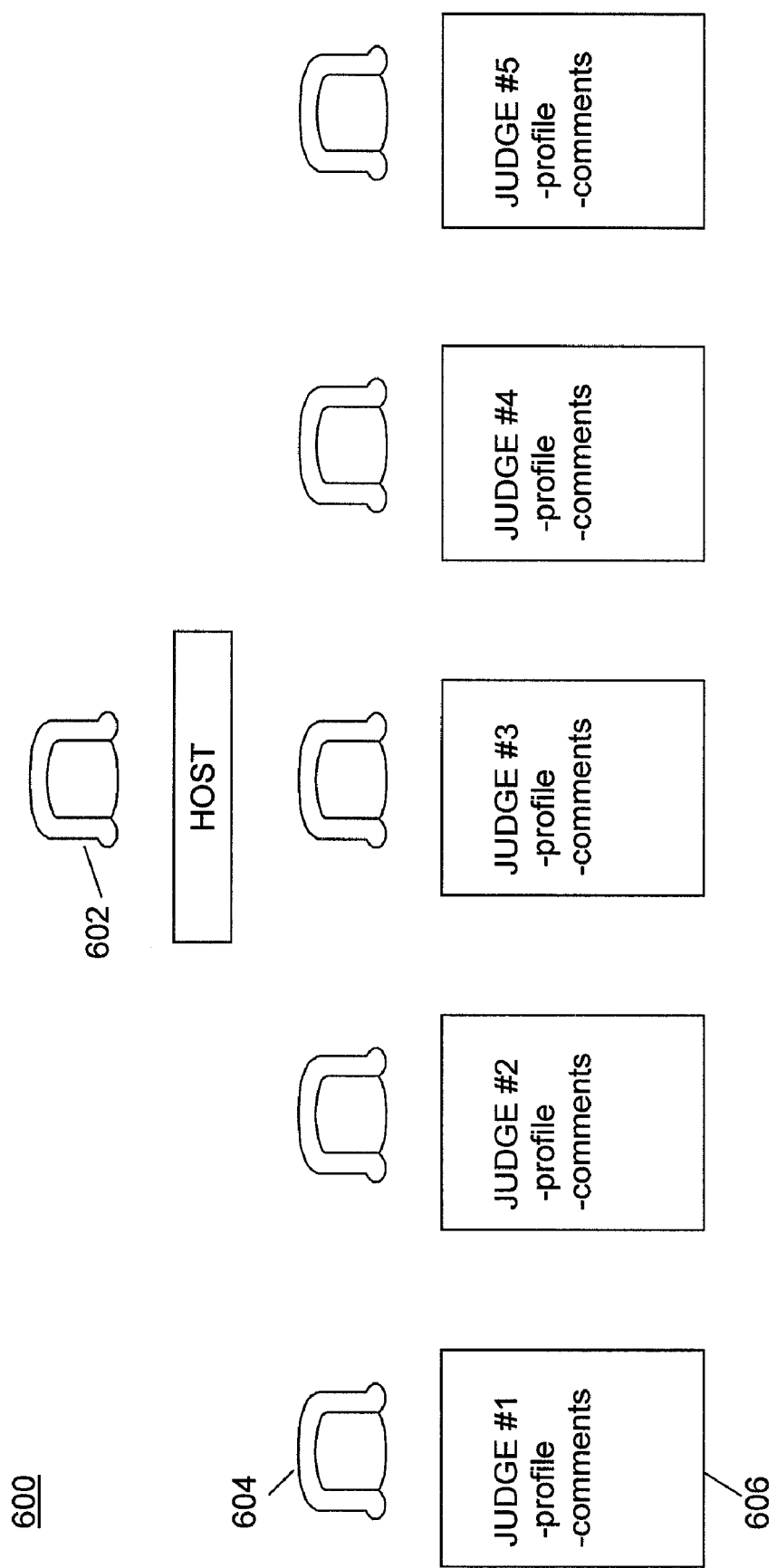
FIG. 6 illustrates a virtual panel of judges for use in a graphical user interface of the feedback component, under an embodiment.

In one embodiment, the user feedback process 126 conforms to a judging paradigm in which a host oversees the event and presides over a panel of judges that comment on the user's performance. The feedback process includes a graphical user interface component that represents an animated or graphical depiction of a host and a panel of judges, such as three, five, or seven judges. Each judge is associated with a particular profile that includes personality, background, prejudices, and so on. The commentary provided by each judge varies based on their individual personalities. FIG. 6 illustrates a virtual panel of judges with a host for use in a graphical user interface of the feedback component, under an embodiment. The virtual panel can display a picture of the host 602, as well as a picture of each judge 604 and a respective display window 606 that indicates the judge's name, profile, and comments back to the user. In one embodiment, the host 602 announces the score that the user receives for his or her performance, and each of the judges provides humorous and entertaining comments based on the performance. This provides a level of interaction through animated characters and provides different types of feedback to a user based on the performance.

In one embodiment, the user interface can be configured so that the judges appear to issue their own separate score that varies from judge to judge. In this way, the system appears to let different judges give different scores and feedback based on the performance and their own personality. The ultimate score produced by averaging the judge's individual scores corresponds to the actual score produced by the system.

In one embodiment, the music training and entertainment system incorporates a comprehensive graphical user interface that incorporates the music input and user feedback portions of the system. Such an interface can be provided for any implementation of the system that incorporates a graphic display device, such as a game console, computer network environment, web-based implementation, and so on.

Figure 7:
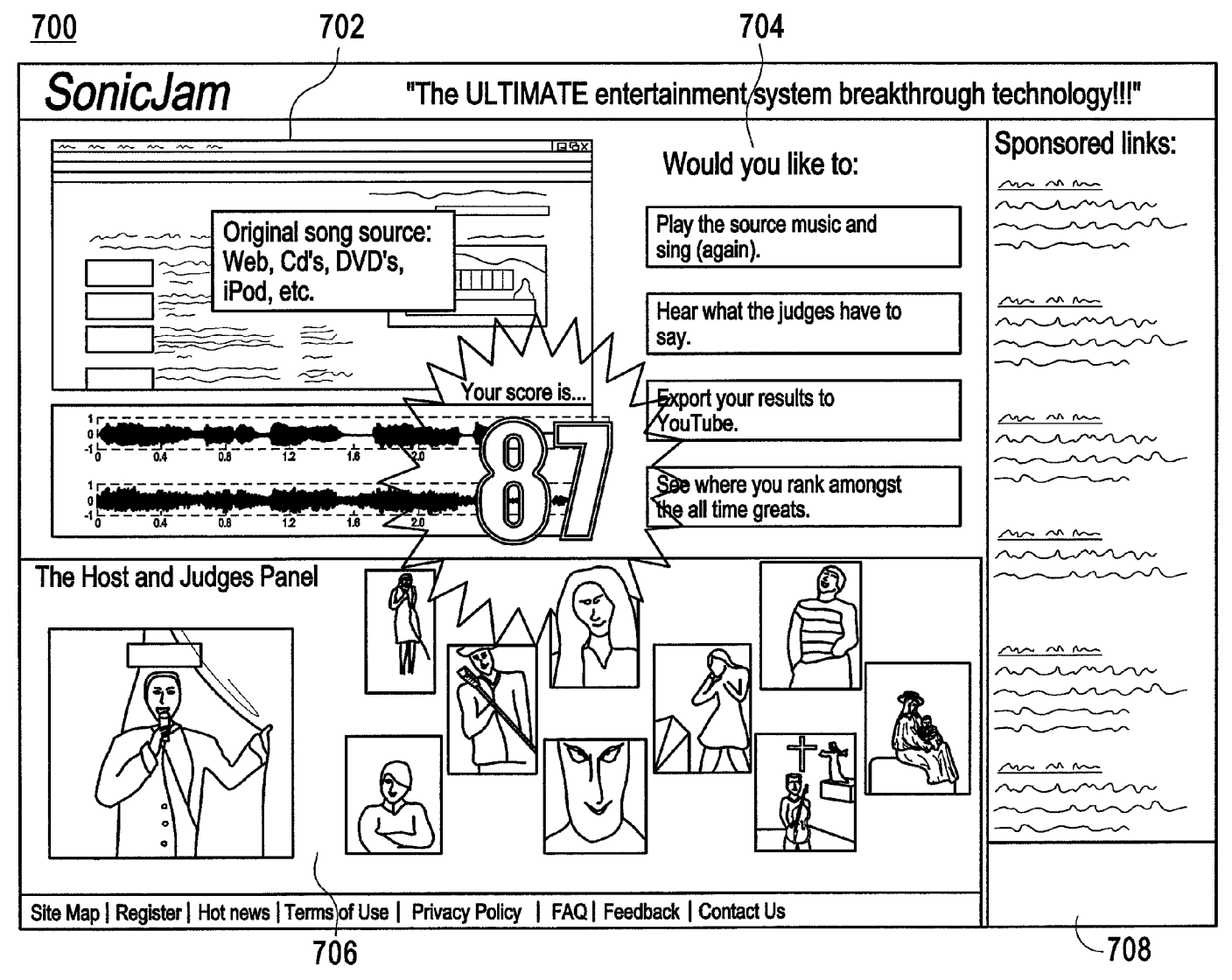

FIG. 7 is an example screen display for a web-based music training and entertainment system, under an embodiment. The display area 700 is divided into a number of separate display windows. Display window 702 displays the input source for the source music files, and can display a CD label or tracks, a source website, and so on. Display area 704 provides an area for user input, and allows the user to play the source music, specify his or her input, select which component of the source music to compare, and display results. In one embodiment, a real-time music analysis histogram 705 is displayed that provides immediate feedback to the user as the source music is played. The judges panel is displayed in display area 706. A sponsor link section 708 can also be provided. The overall score can be displayed in any number of ways such as a flashing number in the center of the screen, as shown, or any other appropriate display means. The score can be shown as a single overall score for the performance, or it can be broken down in terms of the score for each measured parameter, e.g. pitch, rhythm, volume, quality, so that the user can be given an indication of where a particular strength or weakness lies.

In one embodiment, the judges panel is an entertainment component in which each judge is assigned a particular personality and background that results in the generation of unique and amusing quips as part of the feedback to the user. For this embodiment, the single overall score is converted into possibly different converted scores for each judge, so that the different judges can assign different converted scores and feedback for a particular performance. In this case, the overall score is scaled up or down by a pre-determined amount based on the profile of the judge. Thus, one judge might rate one style of music or a particular instrument consistently higher than the other judges, or consistently assign low scores to all performances, and so on. In an interactive embodiment, the judges can also be configured to interact with one another and to provide feedback based on input from the other judges. Any number of interactive mechanisms, dialog and visual components can be implemented depending on the constraints of the playback system.

Figure 10:
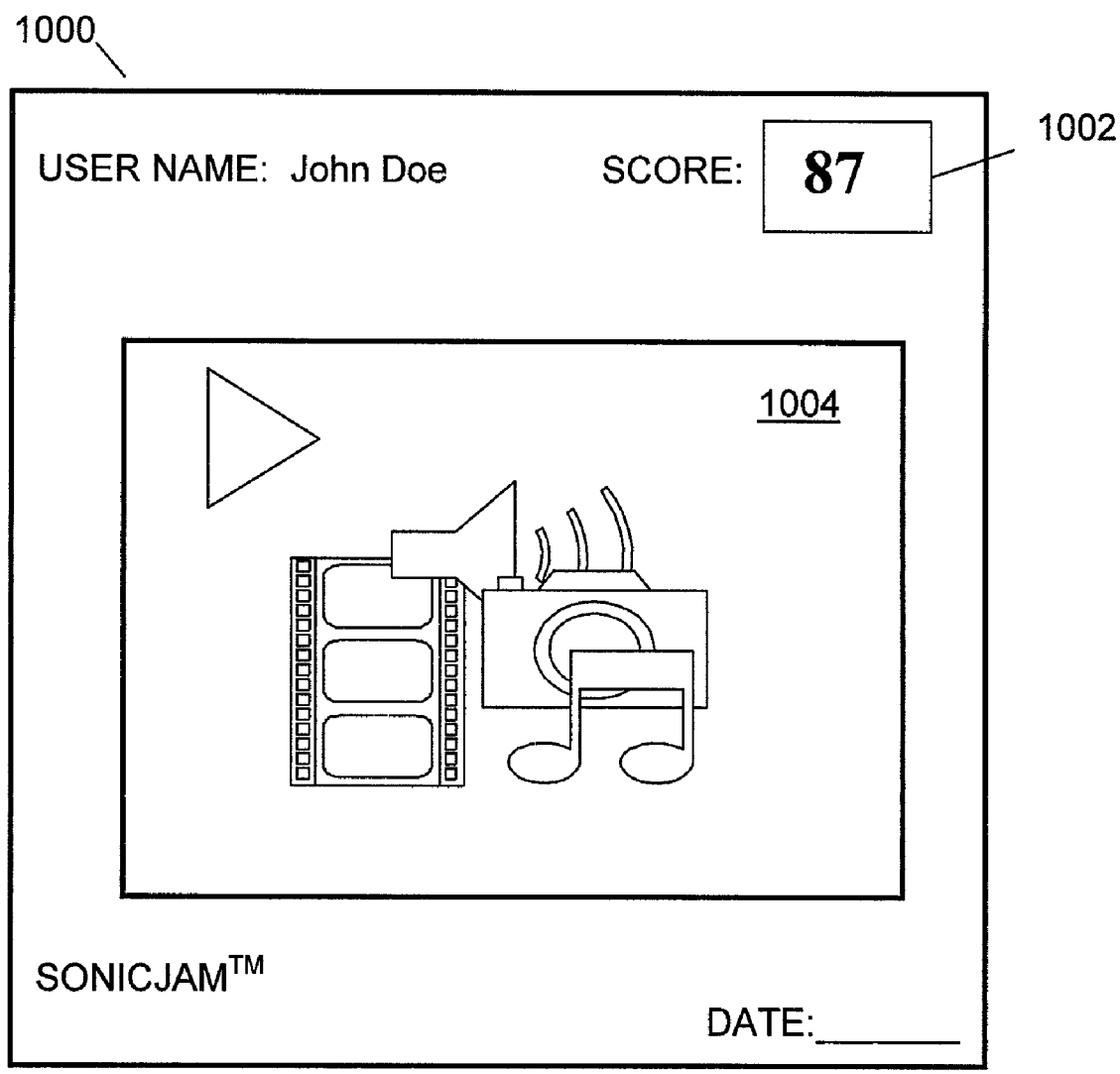
FIG. 10 illustrates a posted user performance for the music training and entertainment system, under an embodiment.

Other entertainment oriented functions that enhance the game playing aspect of the system can also be included, such as a hall of fame for people who score the highest in their auditions, or a hall of shame for those that score the lowest. Links can be provided to popular online sites, such as You-Tube or Myspace so users view each others performances, and allow for viewer voting on performances. FIG. 10 illustrates a posted user performance for the music training and entertainment system, under an embodiment. Display window 1000 includes a panel 1004 in which a video or audio clip of the user performance can be played back. The user name and date of performance are noted, and the score is displayed in display box 1002. FIG. 10 represents an example layout of such as posted page, and many other layouts are possible.

In one embodiment, a registration system is provided to allow users and sponsors to register with the system. This limits access and provides a platform for secure interaction and feedback, as well as certain revenue-generating mechanisms, such as directed ad generation and serving, paid access for talent scouts, industry executives, and the like. In one embodiment, the system incorporates an advertisement or supplemental message serving component that populates a section of the graphical user interface, such as ad display window 708 with appropriate messages. The ads or supplemental messages can be provided over the network by a supplemental server, such as server 113 in FIG. 1 operated by a vendor or third party. The ads to be displayed can be selected on the basis of certain variables, such as type of source content, genre of music, type of user-input component, user score, and so on.

In one embodiment, the advertising content delivered by the system can be varied based on the user performance. In this process user generated input, such as the user's performance, is qualitatively evaluated and a score is assigned to their input. The score determines which piece of advertising content is ultimately displayed. In this embodiment, the ad content may be integrated within the interactive host and judge panel. This allows product or service marketing to be tied directly to a user's performance. For example, if a user generates a particularly low score, an ad for a certain type of product may be displayed, whereas a different product or type of product may be displayed if the user scores a high score. The ad may be displayed in the form of the host or judge holding up the product, or speaking about the product. This provides an element of embedded ad placement based on a user's performance in the interactive game environment.

Figure 9:
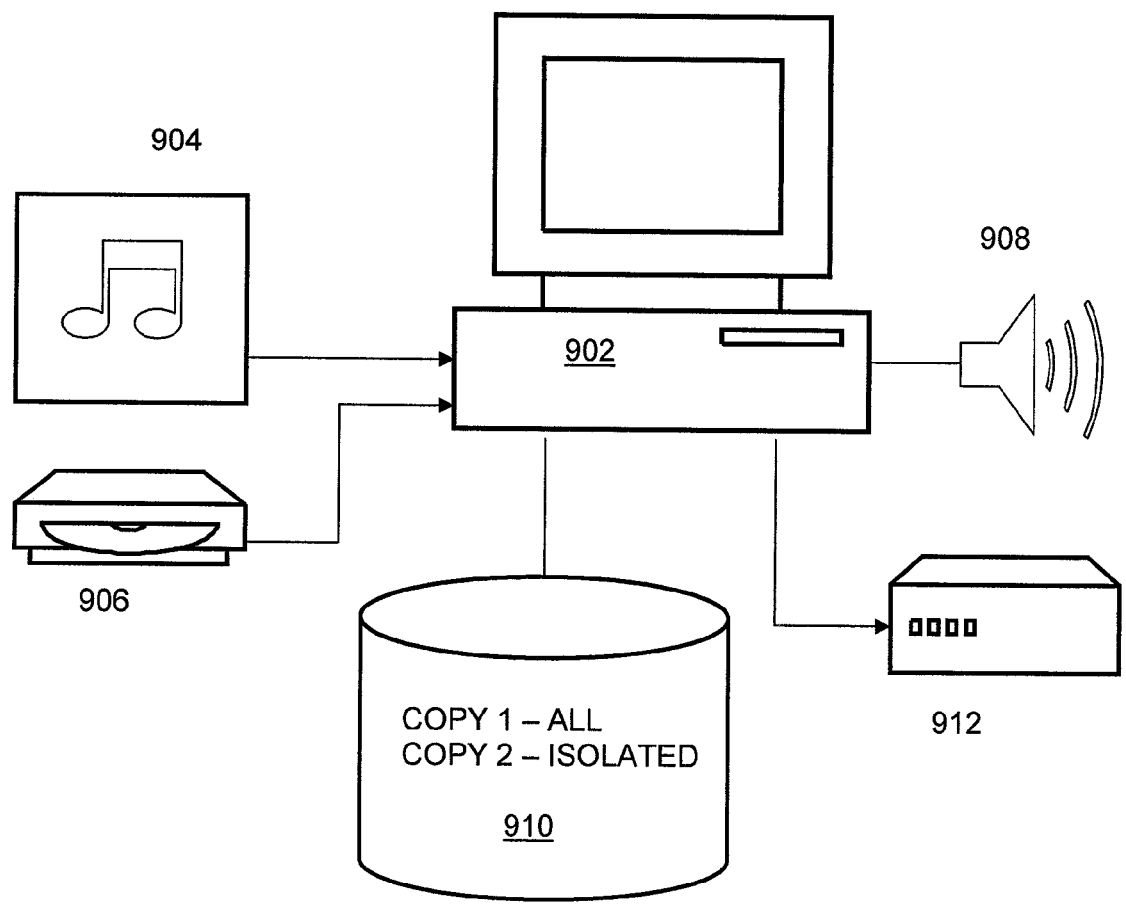
FIG. 9 illustrates a personal computer system that can implement a music training and entertainment process, under an embodiment.

Embodiments of the music training and entertainment system described herein can be implemented in various different forms, such as web-based online applications, computer programs for standalone or networked client-server computers, game consoles, karaoke machines, and so on. FIG. 9 illustrates a personal computer system that can implement a music training and entertainment process, under an embodiment. As shown in system 100, a personal computer, or workstation class computer 902 provides the hardware platform for the user-side of the music training and entertainment process. The user provided component 904 is input into computer 904 through an internal or external microphone, or any other type of adapter suitable to accept instrument or voice input. The source music 906 in the form of digital media (e.g., CD or DVD) is input through an input/output port, such as a USB (Universal Serial Bus) port. The source music may also be provided through a streaming audio or video source, as well as from fixed media. As described above, the process produces two copies of the source music, copy 1 for the entire source content, and copy 2 for the isolated component of the source content. These copies are stored along with the user performance in a data store 910 within or coupled to computer 902. The copy 1 content is then output through speaker 908. The user performance and/or score may be output to an external network through network interface device 912 for posting to network websites or transmission to other network devices or computers.

Figure 12:
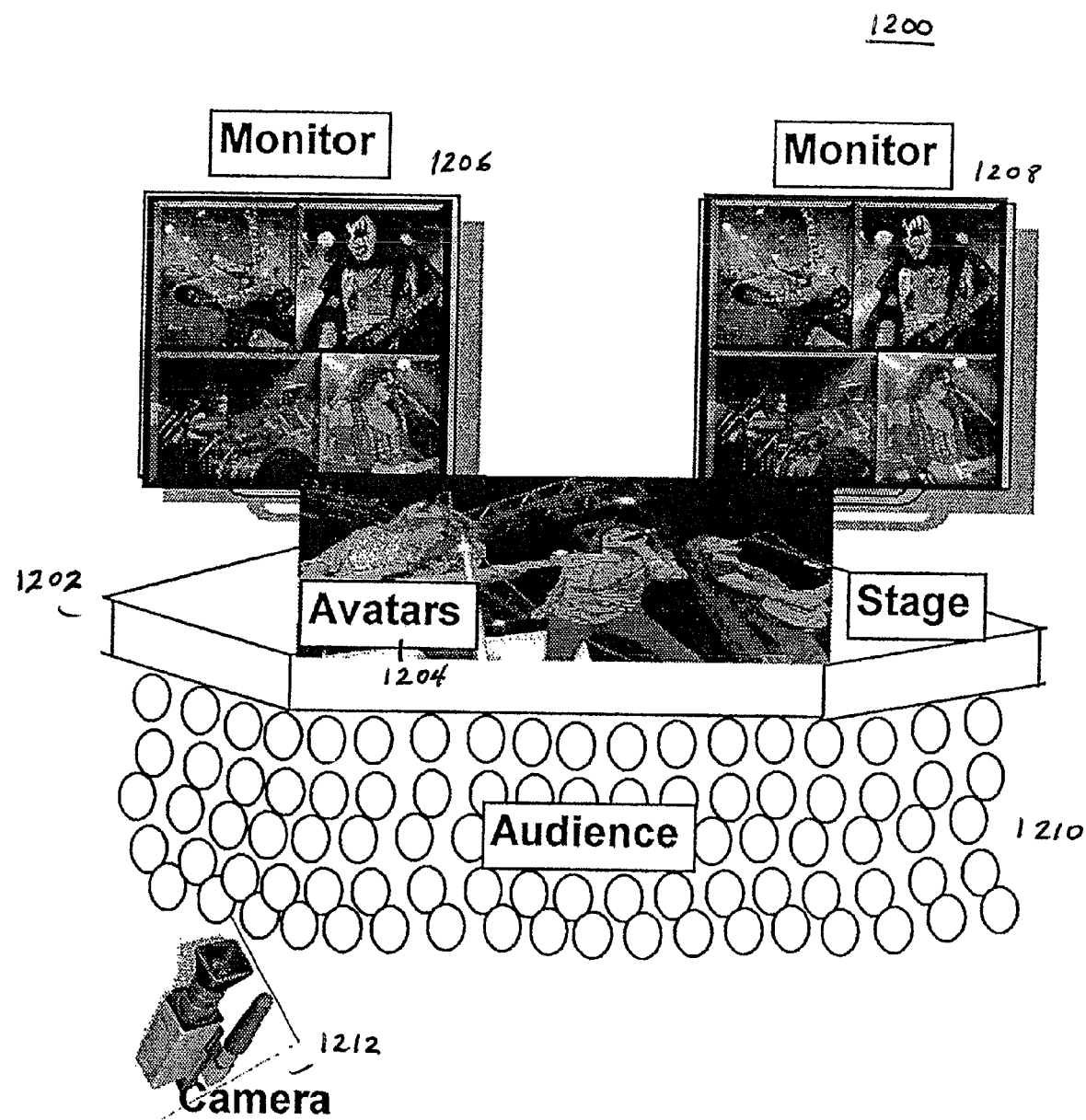
FIG. 12 illustrates an interactive music entertainment system, according to an embodiment.

In one embodiment, the interactive music entertainment system includes an interactive graphical user interface that provides the user with a virtual concert environment. The user is represented as an avatar on a stage in front of an audience. One or more virtual cameras are placed in relation to the stage and the image of the performer from the point of view of the camera is projected through one or more monitors. FIG. 12 illustrates an interactive music entertainment system, according to an embodiment. As shown in GUI screen 1200, a stage 1202 is shown on which are displayed one or more avatars 1204 representing the user and any additional band members, or the different members of a band for the embodiment in which multiple users perform as a band. In one embodiment, the user avatar is configured to be outfitted according to the instrument which the user is actually utilizing for the performance. If the user is singing along with a song, the avatar will be shown holding a microphone. If the user is playing a guitar or any other instrument, the avatar will be shown with that corresponding instrument.

An audience 1210 is shown in front of the stage 1202. Other elements, such as a host avatar, and a panel of judges, among other elements can also be provided in interface 1200. One or more virtual cameras 1212 are also provided. The image captured from the vantage point of the camera is displayed on one or more monitors 1206 and 1208 that are placed in a location, such as behind the stage 1202. The camera and monitor system allows the user to view the depiction of his or her performance in real time. As the user performs, the avatar moves in a corresponding manner to represent the singing and or playing of the user, and this movement is shown on the monitors. In one embodiment, the process includes a graphics import module that allows a user, judge, audience member, or any other participant to import a graphic that directly represents that person. Thus, for example, a user can use a picture of him or herself as the avatar.

Figure 13:
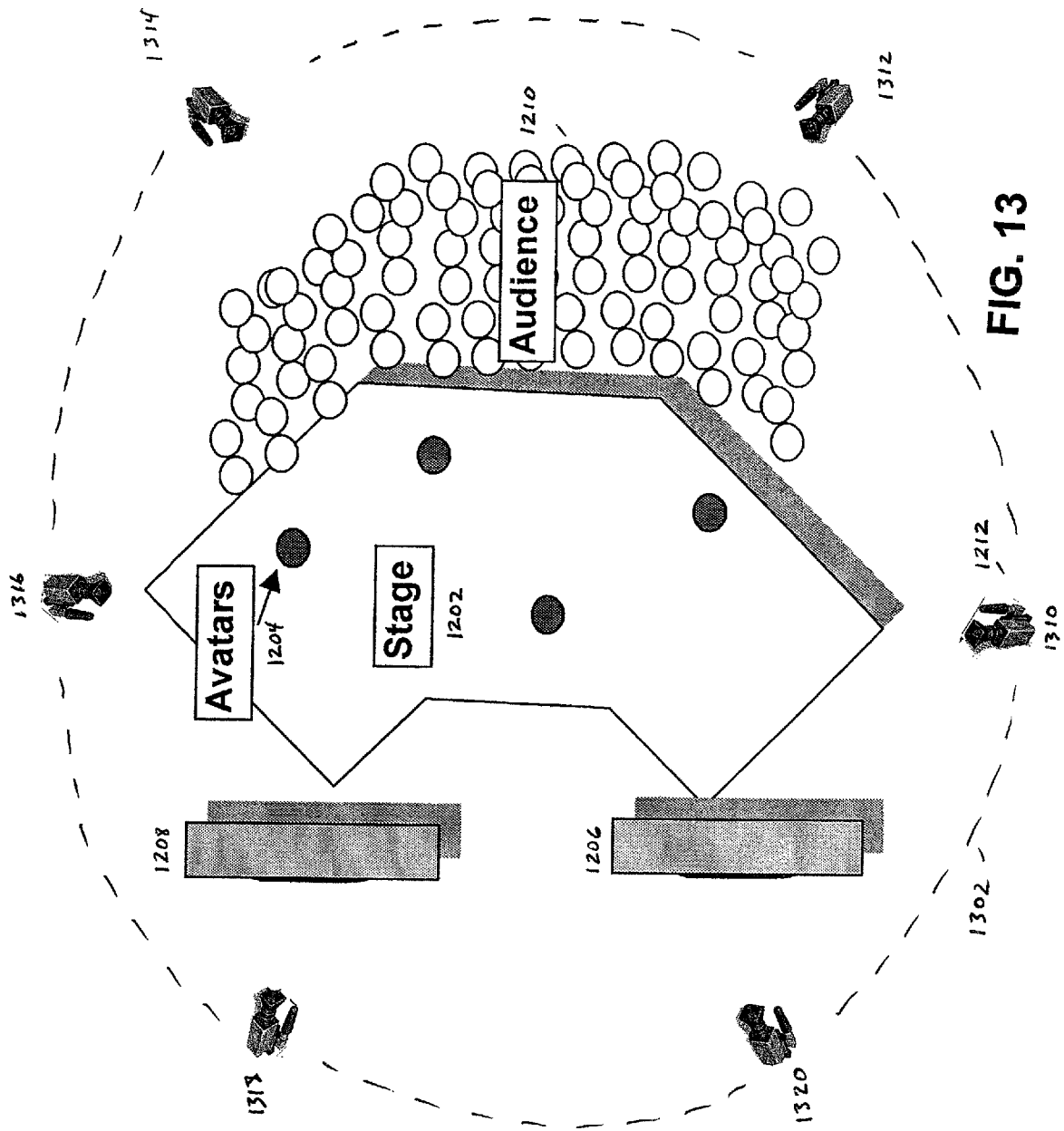
FIG. 13 illustrates various virtual camera angles for the interactive music entertainment system of FIG. 12, according to an embodiment.

As shown in FIG. 12, a camera 1212 is shown in a particular location relative to the stage 1202. The monitor or monitors 1206 show the avatars from this location. In one embodiment, the camera moves among different locations or vantage points relative to the stage. The camera thus effectively moves around the stage in a circular or semicircular manner. FIG. 13 illustrates various virtual camera angles for the interactive music entertainment system of FIG. 12, according to an embodiment. As shown in FIG. 13, the stage 1202 with the avatar or avatars 1204 super imposed is surrounded by the audience 1210 and monitors 1206 and 1208. The camera 1212 is moved along a path 1302 among different vantage points 1310 to 1320. As the camera moves along the path, the image shown on the monitors shifts to correspond to the updated camera location. In one embodiment, the camera moves smoothly and continuously along the path 1302. Alternatively, the camera can be depicted as taking images from specific points along the path for several seconds or minutes. Any number of points can be defined. For the embodiment illustrated in FIG. 13, six different points 1310 to 1320 are defined in a hexagon surrounding the stage.

In one embodiment, the reaction of the audience to the performance can be used to mirror the feedback provided by the judges. As the user's score increases, the audience reaction, as depicted through applause, yelling, dancing, movement, and so on, can increase. Similarly, if the user's score is very low, the audience reaction can be depicted through booing, walking out, and so on. For this embodiment, animation processes that depict the type and level of audience response to a performance are directed by scores provided by the judges. For implementations in which scores are provided at specific intervals of a performance, or in which user performance is tracked continuously by the comparison process, audience feedback can reflect user performance on a real-time or near real-time basis. This allows an added feature of feedback that the user can rely on to alter his or her performance. A base-line level of audience participation and reaction can be defined on the basis of music genre. For example, a classical music audience may be very reserved compared to the audience for a punk rock performance.

In one embodiment, the interactive music training and entertainment system is provided as an online role playing game platform wherein one or more online users are represented as avatars watching the user's performance as part of the audience. These users are coupled to the performing user through an online connection, which allows direct interaction among these users. For example, users can send text messages to one another, vote on a performance by sending in scores, and so on. For the online embodiment, sources of music or other audio is typically provided directly through the network connection from host websites or network sites.

The online implementation facilitates a role-playing entertainment environment in which different users can compete against one another in a competition type scenario. In this case, contests may be staged whereby two or more users compete at a scheduled date and time to pit their skills against one another. Tournaments can be organized to determine the champion performer through a series of round-robin, or similar set of competitive rounds. The competitors can compete by comparing their scores using the same song, or they can use different songs. A database can be set up to store the scores of all participants and to keep a hall of fame or hall of shame type of record structure. For the role-playing embodiment, competitors within a tournament can become members of the audience for implementations in which audience avatars are utilized.

Within the context of a multi-user role-playing game environment, the system could further be configured to generate a periodic selection of material for each major genre of music or selection of content. For this embodiment, the system includes a web crawler process that identifies new derivative works for songs within a particular genre. An auto-scoring process would then compare and score the new derivatives against standard versions of the work.

As an alternative to an online implementation, embodiments can be implemented in the form of distributed media that can be executed on one or more personal computer, notebook, or workstation class computing devices. For this embodiment, one or more executable modules of the music training and entertainment process 112 are provided on media, such as compact disk (CD), digital versatile disk (DVD), floppy disk, flash memory, tape, or any similar media or downloadable stream to be loaded and executed on the client computer. For this embodiment, the program may include processes that automatically link to online websites, or provide links to online sites that source music or other audio content, such as YouTube and iTunes. In addition, or alternatively, source music can be provided by a database that is pre-stored with any number of audio or music files. Such a database can be a static repository of content, or it can be replenished or periodically filled through a subscription service. This embodiment leverages any Internet or other network connectivity available on the client computer, though the process itself is embodied in a program that is locally loaded and executed. This network connectivity can also be used to provide a record of the user's performance to external sources. A video or audio clip of the performance is stored as a file on the client computer hard drive or other resident memory. This clip can also be served to external devices, such as MP3 players, or to external websites, such as YouTube, Facebook, MySpace, or other social network or similar websites. The client computer for the resident executable (boxed software) version of the process may be any type of client computer, workstation, game platform, kiosk, portable computer, or similar processing device that has sufficient processing power and network connectivity.

Lyric Extraction and Generation

Figure 14:
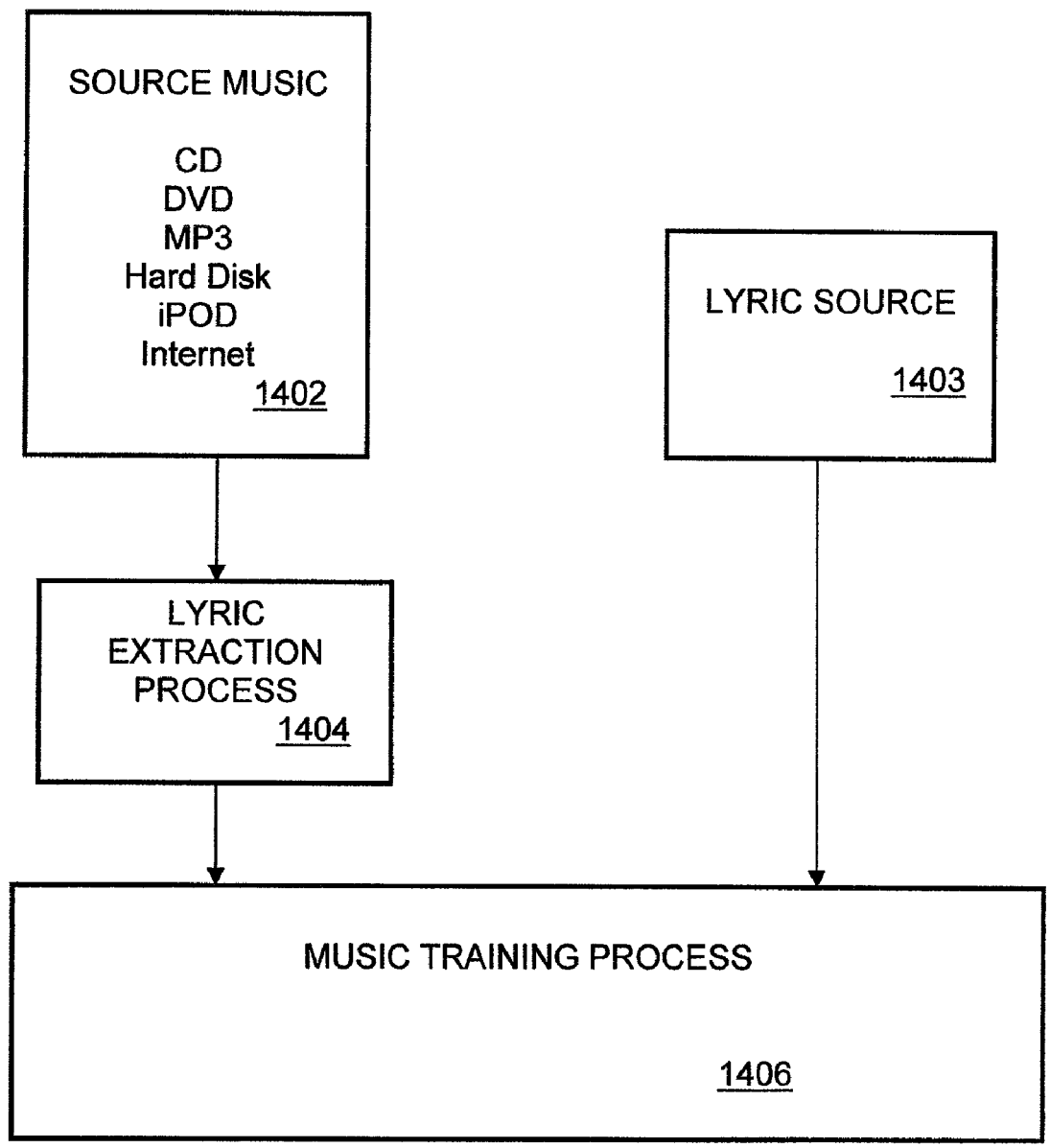
FIG. 14 illustrates a lyric extraction and generation process, under an embodiment.

In one embodiment, the music training and entertainment system includes a lyric generation that provides lyrics to the songs to aid the users in their vocal performance. Unlike present Karaoke systems in which the lyrics are displayed on a screen while a backing track is played, the lyric generation process generates lyrics that are extracted from the actual recording itself rather than pre-programmed in the system. FIG. 14 illustrates a lyric extraction and generation process, under an embodiment. As shown in FIG. 14, the source music file 1402 is input to a lyric extraction process 1404. This process extracts the vocal portion of the music clip. Process 1404 includes a speech-to-text program that converts the vocal lyrics into text lyrics. The text lyrics are then displayed on the display screen to enable the user to view the words to be sung. The lyrics can be displayed as an overlay in the main display area of the program, or they can be displayed in a separate text window in the display area. In one embodiment, the source music is input to the lyric extraction process 1404 a small period of time prior to playback through the music training process 1406. That is, the playback of the audio track is delayed by the delay period, which may be on the order of two to five seconds, so that the vocals can be extracted and the text lyrics generated on the display in synchronization with the audio track as it is played to the user. In this manner, it appears to the user that the lyrics are effectively created in real time. In certain implementations, lyrics to songs may be available from a source, such as a website or database. In this case, lyrics are input to the music training process 1406 directly from the lyric source 1403. No speech-to-text conversion is necessary, however, the music training process 1406 includes a synchronization feature that synchronizes the display of the lyrics with the music playback.

In an alternative embodiment, the system can also include musical score generation system. In this case, a scoring process takes as input the source music and determines the notes being played in the melody that is being suppressed and played by the user. The notes are then transcribed to musical notation which can then be displayed on the display screen in sync with the remaining audio tracks. The music can be displayed as standard notation, or it can be converted to alternate formats, such as tablature for guitars or basses, or chord charts for pianos and keyboards.

Although embodiments described herein are directed to receiving music content from a source, it should be noted that the input content could be any type of data stream, against which a user wishes to compare his or her own version of the data. For audio applications, such embodiments could include voice coaching systems, foreign language education systems, speech therapy systems, and the like.

Aspects of the music training and entertainment system described herein may be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects of the music training and entertainment method include: microcontrollers with memory (such as EEPROM), embedded microprocessors, firmware, software, etc. Furthermore, aspects of the described method may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various functions disclosed herein may be described using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, e-mail, etc.) over the Internet and/or other computer networks via one or more data transfer protocols (e.g., HTTP, FTP, SMTP, and so on).

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of illustrated embodiments of the music training and entertainment system is not intended to be exhaustive or to limit the embodiments to the precise form or instructions disclosed. While specific embodiments of, and examples for, the system are described herein for illustrative purposes, various equivalent modifications are possible within the scope of the described embodiments, as those skilled in the relevant art will recognize.

The elements and acts of the various embodiments described above can be combined to provide further embodiments. These and other changes can be made to the music training and entertainment system in light of the above detailed description.

In general, in any following claims, the terms used should not be construed to limit the described system to the specific embodiments disclosed in the specification and the claims, but should be construed to include all operations or processes that operate under the claims. Accordingly, the described system is not limited by the disclosure, but instead the scope of the recited method is to be determined entirely by the claims.

While certain aspects of the music training and entertainment system are presented below in certain claim forms, the inventor contemplates the various aspects of the methodology in any number of claim forms. For example, while only one aspect of the system is recited as embodied in machine-readable medium, other aspects may likewise be embodied in machine-readable medium. Accordingly, the inventor reserves the right to add additional claims after filing the application to pursue such additional claim forms for other aspects of the described systems and methods.

What is claimed is:

1. A method of providing an interactive entertainment system comprising:
   receiving a source stream from a source, the source stream comprising a plurality of components;
   suppressing a user selected portion of the source stream during playback of the source stream to a user;
   receiving a user provided component corresponding to the suppressed component of the source stream simultaneously with the source stream;
   determining a first waveform area for the suppressed component and a second waveform area for the user provided component;
   comparing the pitch, rhythm, and sonic quality of the user provided component with the pitch, rhythm, and sonic quality of the suppressed component of the source stream to derive an aggregate score corresponding to the similarity of the user provided component with the suppressed component, wherein the quality is compared by comparing the first waveform area to the second waveform area;
   displaying an avatar representing the user on a stage in a concert setting including an audience and a panel of one or more judges; and
   displaying, through the panel of the one or more judges, the aggregate score corresponding to the similarity of the user provided component with the suppressed component.

2. The method of claim 1 further comprising:
   correlating the aggregate score to a qualitative text message, wherein the qualitative text message is provided to the user through the panel of one or more judges; and
   manifesting a correlation between the similarity of the user provided component with the suppressed component as an audience reaction.

3. The system of claim 2 wherein the source stream comprises music, and the source is selected from the group consisting of: streaming music content, pre-recorded digital media, pre-recorded analog media, and a live performance by one or more performers.

4. The system of claim 3 wherein the user selected component is selected from the group consisting of vocal, guitar, keyboard, drums, and an ensemble of instruments.

5. The system of claim 1 wherein the aggregate score is generated by averaging separate scores created for each of: a comparison of the pitch of the suppressed component with the pitch of the user provided component, a comparison of the rhythm of the suppressed component with the rhythm of the user provided component, and a comparison of the quality of the suppressed component with the quality of the user provided component.

6. The system of claim 1 further comprising:
displaying a representation of the user performance on one or more virtual screens adjacent the displayed stage; and
panning the displayed representation across a plurality of camera angles relative to the displayed stage.

7. A graphical user interface comprising:
a virtual stage containing an avatar of a user providing a performance of a song, wherein the performance comprises a user provided component of a song that has been suppressed from an original source recording of the song, and wherein the user provided component is selected from the group consisting of vocal, guitar, keyboard, and drums, and further wherein the avatar is displayed as playing an instrument corresponding to the user selected component;
an interactive audience configured to respond to the performance based on the similarity of the user provided component with the original suppressed component;
one or more virtual big screen monitors displaying a depiction of the user performance from the vantage points of a plurality of cameras surrounding the virtual stage; and
a virtual panel of one or more judges, the judges displaying a score corresponding to the similarity of the user provided component with the original suppressed component, wherein the score is derived by comparing the user provided component with the original suppressed component across a plurality of characteristics comprising pitch, rhythm, and sonic quality.

8. The user interface of claim 7 further comprising an input process configured to receive a graphic file representing the user and display the graphic file as an overlay of the avatar.

9. The user interface of claim 7 wherein the sonic quality is determined by comparing a first waveform area for the suppressed component to a second waveform area for the user provided component.

* * * * *